US006182035B1

(12) United States Patent
Mekuria

(10) Patent No.: US 6,182,035 B1
(45) Date of Patent: Jan. 30, 2001

(54) METHOD AND APPARATUS FOR DETECTING VOICE ACTIVITY

(75) Inventor: Fisseha Mekuria, Lund (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 09/048,307

(22) Filed: Mar. 26, 1998

(51) Int. Cl.[7] .......................... G10L 15/08; G10L 11/00; G10L 17/00

(52) U.S. Cl. ......................... 704/236; 704/230; 704/248; 704/240

(58) Field of Search .................................... 704/233, 248, 704/236, 204, 240, 267, 229, 230

(56) References Cited

U.S. PATENT DOCUMENTS

| | | | | |
|---|---|---|---|---|
| 5,276,765 | | 1/1994 | Freeman et al. | 395/2 |
| 5,377,302 | * | 12/1994 | Tsiang | 704/235 |
| 5,436,940 | * | 7/1995 | Nguyen | 375/240 |
| 5,459,814 | | 10/1995 | Gupta et al. | 395/2.42 |
| 5,490,233 | * | 2/1996 | Kovacevic | 704/230 |
| 5,596,680 | | 1/1997 | Chow et al. | 395/2.57 |
| 5,826,232 | * | 10/1998 | Gulli | 704/267 |
| 5,913,186 | * | 6/1999 | Byrnes et al. | 704/204 |

FOREIGN PATENT DOCUMENTS

| | | | | |
|---|---|---|---|---|
| 0 167 364 | * | 1/1986 | (EP) | G10L/3/00 |
| 0 599 664 | * | 6/1994 | (EP) . | |
| 0 665 530 | * | 8/1995 | (EP) . | |
| 2 256 351 | * | 12/1992 | (GB) . | |
| WO 95/08170 | | 3/1995 | (WO) | G10L/3/00 |
| WO 97/22117 | | 6/1997 | (WO) | G10L/3/00 |

OTHER PUBLICATIONS stegman et al., (“Robust voice activity detection based on the wavelet transform”, Proceedings IEEE Workshop on Speech coding for telecommunications, 7–10, Sep. 1997, pp. 99–100).*

Evangelista et al., (“Discrete–time Wavelet transforms and their generalizations”, IEEE International Symposium Circuits and Systems, 1990., vol. 3, May 1–3, 1990, pp. 2026–2029).*

(List continued on next page.)

*Primary Examiner*—David R. Hudspeth
*Assistant Examiner*—Vijay B Chawan
(74) *Attorney, Agent, or Firm*—Burns, Doane, Swecker & Mathis, L.L.P.

(57) ABSTRACT

A voice activity detector that implements a fast wavelet transformation using filter pairs. A quadrature high pass filter provides an output signal corresponding to the upper half of the Nyquist frequency and a quadrature low pass filter provides an output signal corresponding to the lower half of the Nyquist frequency. The quadrature high pass filter is useful for catching and isolating transients in the input signal and the quadrature low pass filter is useful for fine frequency analysis. The voice activity detector can utilize multiple decomposition levels that are arranged in a pyramid or tree formation to increase the reliability of the voice activity decision. For example, the output of the quadrature low pass filter can be further decomposed using a second pair of filters. The voice activity decision can be generated by comparing a signal power estimate for the output of the filter pairs to threshold levels that are specific for each filter or frequency range. The reliability of the voice activity decision is maximized by training the system to determine the optimum threshold levels and by basing the decision on a combination of the signal outputs. While increasing the number of decomposition levels increases the reliability of the voice activity decision, three decomposition levels is usually sufficient for detecting speech activity.

26 Claims, 7 Drawing Sheets

OTHER PUBLICATIONS

S.C.Chan., ("A family of arbitrary length modulated orthonormal wavelets", IEEE International Symposium on Circuits and Systems, vol. 1, May 3–6, 1993, pp. 515–518).*

Gopinath et al., ("Wavelet Transforms and Filter Banks", Wavelets–A Tutorial in theory and Application, C.K. Chui ed., pp. 603–654, Academic Press, inc., Jan. 1992.*

J. Stegmann, et al., "Robust Voice–Activity Detection Based on the Wavelet Transform," Proceedings IEEE Workshop on Speech Coding for Telecommunications. Back to Basics: Attacking Fundamental Problems in Speech Coding, Sep. 7–10 1997, pp. 99–100.*

J. D. Hoyt, et al., "Detection of Human Speech Using Hybrid Recognition Models," Proceedings of the IAPR International Conference on Pattern Recognition (ICPR), vol. 2, Oct. 9–13 1994, pp. 330–333.*

F. Mekuria, "Implementation of the Fast Wavelet Transform for Noise Cancelling in Hands–free Mobile Telephony", ICSPAT–95, Ericsson Mobile Communication AB, 1995; pp. 312–315.*

F. Strang et al., "Wavelets and Filterbanks", Wellesley–Cambridge Press, 1996, pp. 24–35.*

* cited by examiner

FIG. 1a
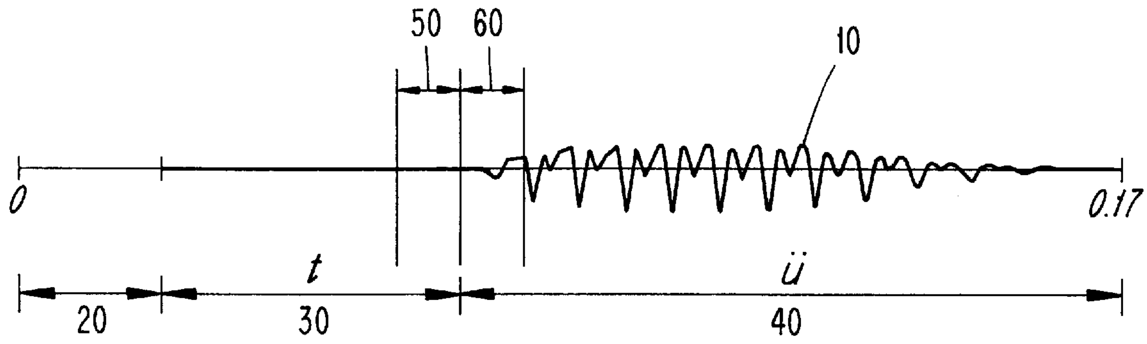
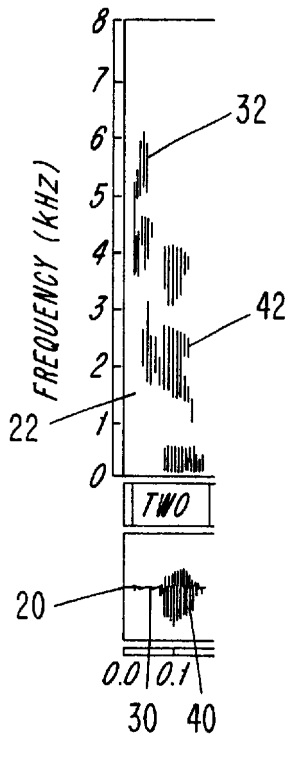
FIG. 1b

METHOD AND APPARATUS FOR DETECTING VOICE ACTIVITY

BACKGROUND

The present invention relates to distinguishing between two non-stationary signals, and more particularly, to using a wavelet transform to detect voice (speech) activity.

Speech is produced by excitation of an acoustic tube, the vocal tract, which is terminated on one end by the lips and on the other end by the glottis. There are three basic classes of speech sounds. Voiced sounds are produced by exciting the vocal tract with quasi-periodic pulses of airflow caused by the opening and closing of the glottis. Fricative sounds are produced by forming a constriction somewhere in the vocal tract and forcing air through the constriction so that turbulence is created, thereby producing a noiselike excitation. Plosive sounds are produced by completely closing off the vocal tract, building up pressure behind the closure, and then abruptly releasing it.

It is well known in the art that because a vocal tract has a constant shape, voiced signals can be modeled as the response of a linear time-invariant system to a quasi-periodic pulse train. Unvoiced sounds can be modeled as wideband noise. The vocal tract is an acoustic transmission system characterized by natural frequencies (formants) that correspond to resonances in its frequency response. In normal speech, the vocal tract changes shape relatively slowly with time as the tongue and lips perform the gestures of speech, and thus the vocal tract can be modeled as a slowly time-varying filter that imposes its frequency-response on the spectrum of the excitation.

FIG. 1*a* illustrates a waveform for the word "two." The waveform is an example of a non-stationary signal because the signal properties vary with time. Background noise is another example of a non-stationary signal. However, unlike background noise, the characteristics of a speech signal can be assumed to remain essentially constant over short (30 or 40 ms) time intervals.

FIG. 1*b* illustrates a spectrogram of the waveform shown in FIG. 1*a*. The frequency content of speech can range up to 15 kHz or higher, but speech is highly intelligible even when bandlimited to frequencies below about 3 kHz. Commercial telephone systems usually limit the highest transmitted frequency to the 3–4 kHz range.

A typical speech waveform consists of a sequence of quasi-periodic voiced segments interspersed with noise-like unvoiced segments. A GSM speech coder, for example, takes advantage of the fact that in a normal conversation, each person speaks on average for less than 40% of the time. By incorporating a voice activity detector (VAD) in the speech coder, GSM systems operate in a discontinuous transmission mode (DTX). Because the GSM transmitter is inactive during silent periods, discontinuous transmission mode provides a longer subscriber battery life and reduces instantaneous radio interference. A comfort noise subsystem (CNS) at the receiving end introduces a background acoustic noise to compensate for the annoying switched muting which occurs due to DTX.

Voice activity detectors are used quite extensively in the area of wireless communications. Voice activity detectors are not only used in GSM speech coders, but they are also used in other discontinuous transmission systems, noise suppression, echo canceling, and voice dialing systems. Because speech is usually accompanied by background noise, some segments of a speech signal have voiced sounds with background noise, some segments have noise-like unvoiced sounds with background noise, and some segments have only background noise. The voice activity detector's job is to distinguish voiced regions of the signal from unvoiced or background noise regions.

There are several known methods for voice activity detection. For example, U.S. Pat. No. 5,459,814 discloses a method in which an average signal level and zero crossings are calculated for the speech signal. Similarly, U.S. Pat. No. 5,596,680 discloses performing begin point detection using power/zero crossing. Once the begin point has been detected, the cepstrum of the input signal is used to determine the endpoint of the sound in the signal. After both the beginning and ending of the sound are detected, this system uses vector quantization distortion to classify the sound as speech or noise. While these methods are relatively easily to implement, they are not considered to be reliable.

Patent publication WO 95/08170 and U.S. Pat. No. 5,276,765 disclose a method in which a spectral difference between the speech signal and a noise estimate is calculated using linear prediction coding (LPC) parameters. These publications also disclose an auxiliary voice activity detector that controls updating of the noise estimate. While this method is relatively more reliable than those previously discussed, it is still difficult to reliably detect speech when the speech power is low compared to the background noise power.

Input signals are often analyzed by transforming the signal to a plane other than the time domain. Signals are usually transformed by utilizing appropriate basis functions or transformation kernels. The Fourier transform is a transform that is often used to transform signals to the frequency domain. The Fourier transform uses basis functions that are orthonormal functions of sines and cosines with infinite duration. The transform coefficients in the frequency domain represent the contribution of each sine and cosine wave at each frequency.

Patent publication WO 97/22117 is an example of how the Fourier transform is used to detect voice activity. WO 97/22117 discloses dividing an input signal into subsignals representing specific frequency bands, estimating noise in each subsignal, using each noise estimate to calculate subdecision signals, and using each subdecision signal to make a voice activity decision.

The problem with using the Fourier transform is that the Fourier transform works under the assumption that the original time domain signal is periodic in nature. As a result, the Fourier transform is poorly suited for nonstationary signals having discontinuities localized in time. When a non-stationary signal has abrupt changes, it is not possible to transform the signal using infinite basis functions without spreading the discontinuity over the entire frequency axis. The transform coefficients in the frequency domain can not preserve the exact occurrence of the discontinuity and this information is lost.

Unfortunately, many real signals are nonstationary in nature and the analysis of these signals involves a compromise between how well transitions or discontinuities are located and how finely long-term behavior can be identified. One attempt to improve the performance of the Fourier transform involves replacing the complex sinusoids of the Fourier transform with basis functions composed of windowed complex sinusoids. This technique, which is often referred to as the short time Fourier transform (STFT), is best illustrated by the equation, $$T_F(\omega,\tau)=\int_{-\infty}^{\infty}e^{-j\omega\tau}h(t-\tau)x(t)dt \quad (1)$$

where h(.) is a window function and $T_F(\omega,\tau)$ is the Fourier transform of x(t) windowed with h(.) shifted by τ. Although the STFT overcomes some of the problems associated with using infinite basis functions, the STFT still suffers from the fact that the analysis product is the same at all locations in the time-frequency plane. Generally speaking, voice activity detectors that use the Fourier transform or the short time Fourier transform are unreliable and require costly (power-consuming) computations. There is a need for a voice activity detector that can reliably and efficiently distinguish voiced regions of speech signals from unvoiced or background noise regions.

SUMMARY

These and other drawbacks, problems, and limitations of conventional voice activity detectors are overcome according to exemplary embodiments of the present invention. It is an object of the present invention to use a wavelet transform to distinguish voiced regions of a signal from unvoiced or background noise regions.

A signal having voiced regions can be transformed using a wavelet transform. A wavelet transform uses orthonormal bases functions called wavelets. A short high frequency basis function is used to catch and isolate transients in the signal, and long low frequency basis functions are used for fine frequency analysis.

It is possible to implement the wavelet transform using quadrature mirror filters. A quadrature high pass filter provides an output signal corresponding to the upper half of the Nyquist frequency and a quadrature low pass filter provides an output signal corresponding to the lower half of the Nyquist frequency.

The voice activity detector can utilize multiple decomposition levels that are arranged in a pyramid or tree formation to increase the reliability of the voice activity decision. For example, the output of the quadrature low pass filter can be further decomposed using a second pair of filters. The voice activity decision can be generated by comparing a signal power estimate for the output of a particular filter to a threshold level that is specific for that filter. The reliability of the voice activity decision is maximized by training the system to determine the optimum threshold levels and by basing the decision on a combination of the signal outputs. While increasing the number of decomposition levels increases the reliability of the voice activity decision, three decomposition levels is usually sufficient for detecting speech activity.

Exemplary embodiments of the present invention are useful in discontinuous transmission systems, noise suppression, echo canceling, and voice dialing systems. An advantage of the present invention is that discontinuities in an input signal are isolated in time. Another advantage of the present invention is that there are fewer computations than other voice detection methods. It is not necessary to compute the inverse discrete wavelet transform, and if filter pairs are used repeatedly, the system implementation is code efficient.

BRIEF DESCRIPTION OF THE DRAWINGS

The foregoing, and other objects, features, and advantages of the present invention will be more readily understood upon reading the following detailed description in conjunction with the drawings in which:

FIG. 1*a* illustrates a typical speech waveform of the word "two";

FIG. 1*b* illustrates a spectrogram of the waveform shown in FIG. 1*a;*

DETAILED DESCRIPTION

Figure 2:
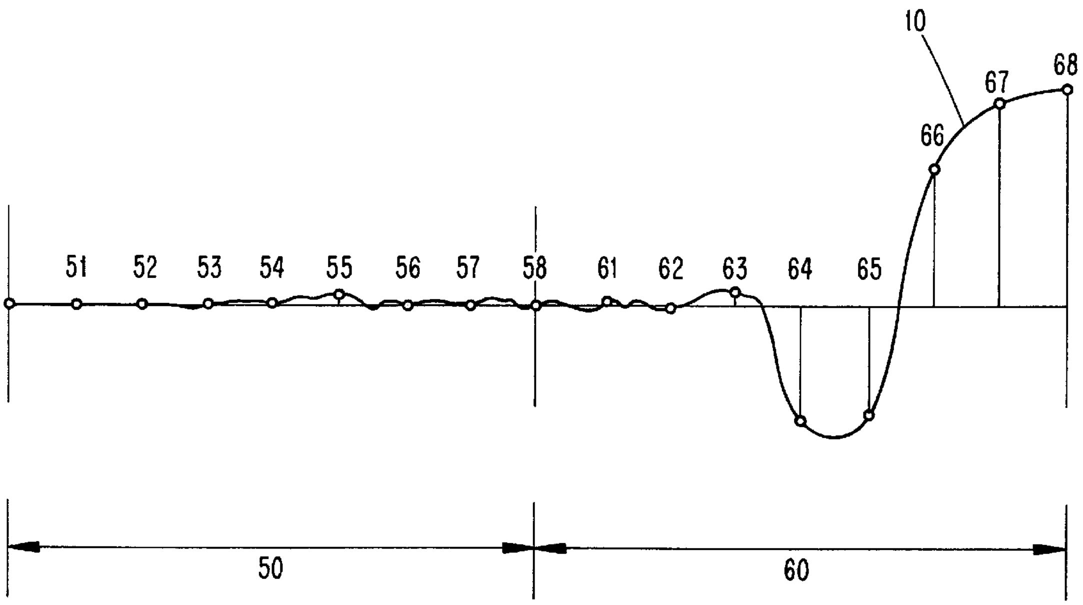
FIG. 2 illustrates a sampled portion of the waveform shown in FIG. 1*a;*

The following description uses specific systems, structures, and techniques to describe the present invention. It will be evident to those skilled in the art that the present invention can be implemented using other systems, structures and techniques than those described below.

As discussed above, FIG. 1*a* illustrates a typical speech waveform of the word "two." Waveform 10 has regions having different signal characteristics. Because speech is a non-stationary signal, there are abrupt changes between region 20, region 30, and region 40. Generally speaking, region 20 can be described as having no sounds, region 30 can be described as having noise-like unvoiced sounds, and region 40 can be described as having voiced sounds.

As shown in FIG. 1*b*, the frequency components of waveform 10 are also discontinuous in nature. Region 20 has no frequency components, region 30 has relatively higher frequency components, and region 40 has relatively lower frequency components.

Speech can be transformed using a wavelet transform. A wavelet transform uses orthonormal basis functions called wavelets. According to the present invention, it is possible to choose short high frequency basis functions to catch and isolate transients in the signal, and long low frequency basis functions for fine frequency analysis. Wavelet transforms provide superior performance in analysis of signals by trading frequency and time resolution in a natural and efficient manner. This tradeoff can be achieved with a finite number of real and nonzero coefficients.

The basis functions can be obtained from a single primary wavelet function by utilizing a translation parameter ($\mu$) and a scaling parameter ($\alpha$), as follows.

$$w_{\alpha,\mu}(t)=\frac{1}{\sqrt{\alpha}}w\left(\frac{t-\mu}{\alpha}\right) \quad (2)$$

The parameters $\alpha$ and $\mu$ are real numbers with $\alpha>0$. For small values of $\alpha$, the basis function becomes a compressed (short window) version of the primary wavelet, i.e. a high frequency finction. A high frequency function provides better time resolution and is useful for catching and isolating transients in the signal. For large values of $\alpha$, the wavelet basis fimction becomes a stretched (long window) version of the primary wavelet, i.e., a low frequency function. A low frequency function is useful for fine frequency analysis.

Based on this definition of the wavelet basis functions, the wavelet transform in the time domain is defined by the following formula, $$T_w(\alpha,\mu)=\frac{1}{\sqrt{\alpha}}\int_{-\infty}^{\infty}w'\left(\frac{t-\mu}{\alpha}\right)x(t)\,dt \tag{3}$$

where w' is the transpose of w. The basis functions given in equation (2) enable the wavelet transform in equation (3) to provide better time resolution for small values of alpha and better frequency resolution for large values of alpha.

To reduce the redundancies associated with analyzing signals using continuous wave transform parameters $(\alpha,\mu)$ the wavelet transform can be computed using a discrete time wavelet transform.

The computation of the wavelet transform in the discrete domain is performed by replacing the primary wavelet parameters $(\alpha,\mu)$ given in equation (2) with discrete versions thereof, as follows, $$w_{kn}(t)=\alpha_0^{-\frac{k}{2}}\cdot w(\alpha_0^{-k}t-n\mu_0) \tag{4}$$

where $\alpha=\alpha_0^{k}$, $\mu=n\alpha_0^{k}\mu_0$, k and n are integers, $\alpha_0>1$ and $\mu_0=0$. A particular set of orthonormal basis functions can be defined for the dyadic case when $\alpha_0=2$ and $\mu_0=1$. The pyramid algorithm for the fast wavelet transform (FWT) is based on this definition. If $\alpha^0=2$ and $\mu_0=1$, then the basis function is as follows, $$w_{kn}(t)=2^{\frac{k}{2}}\cdot w(2^{-k}t-n) \tag{5}$$

where k controls the compression and expansion of the basis function and n controls the time translation of the basis function defined in equation (5).

From a signal processing point of view a wavelet is a bandpass filter. The definition in the dyadic case given in equation (5) actually represents an octave band filter It has been discovered that the wavelet transform can be implemented by using quadrature mirror filters (QMFs). A QMF pair of FIR filters can be used to spectrally decompose an input signal into quadrature low pass (QLP) and quadrature high pass (QHP) sections, where the Nyquist frequency bandwidth is divided equally between the two sections. The pair of filters can have FIR coefficients with the same values, but different signs. The pyramid algorithm described above is implemented by using the wavelet coefficients as the coefficients of a QMF FIR filter pair, as follows,

QLP:

$$L(t)=\sum_{n\in I}C_k^{(n)}w(2t-n) \tag{6}$$

QHP:

$$H(t)=\sum_{n\in I}(-1^{k})C_k^{(n)}w(2t+n) \tag{7}$$

where the $C_k$s are orthonormal wavelet coefficients.

FIG. 2 illustrates a sampled portion of the waveform shown in FIG. 1*a*. In FIG. 1*a*, segment 50 is a 10 ms segment of waveform 10 and segment 60 is an adjacent 10 ms segment of waveform 10. FIG. 2 illustrates an enlarged and sampled view of segments 50 and 60.

The standard sampling rate for digital telephone communication systems is 8000 samples per second (8 kHz). If segment 50 is sampled at 8 kHz, then segment 50 is spanned by eighty samples. If segments 50 and 60 are sampled at 8 kHz, then segments 50 and 60 are spanned by 160 samples.

For simplicity purposes, FIG. 2 illustrates a sampling rate of 800 Hz. Sample 51 is the first sample of segment 50 and samples 52–58 are the second, third, fourth, fifth, sixth, seventh, and eighth samples of segment 50. Similarly, sample 61 is the first sample of segment 60 and samples 62–68 are the second, third, fourth, fifth, sixth, seventh, and eighth samples of segment 60. If segments 50 and 60 are sampled at 8 kHz then sample 51 is the $10^{th}$ sample of segment 50 and samples 52–58 are the $20^{th}$, $30^{th}$, $40^{th}$, $50^{th}$, $60^{th}$, $70^{th}$, and $80^{th}$ samples of segment 50. Similarly, sample 61 is the $10^{th}$ sample of segment 60 and samples 62–68 are the $20^{th}$, $30^{th}$, $40^{th}$, $50^{th}$, $60^{th}$, $70^{th}$, and $80^{th}$ sample of segment 60.

Figure 3:
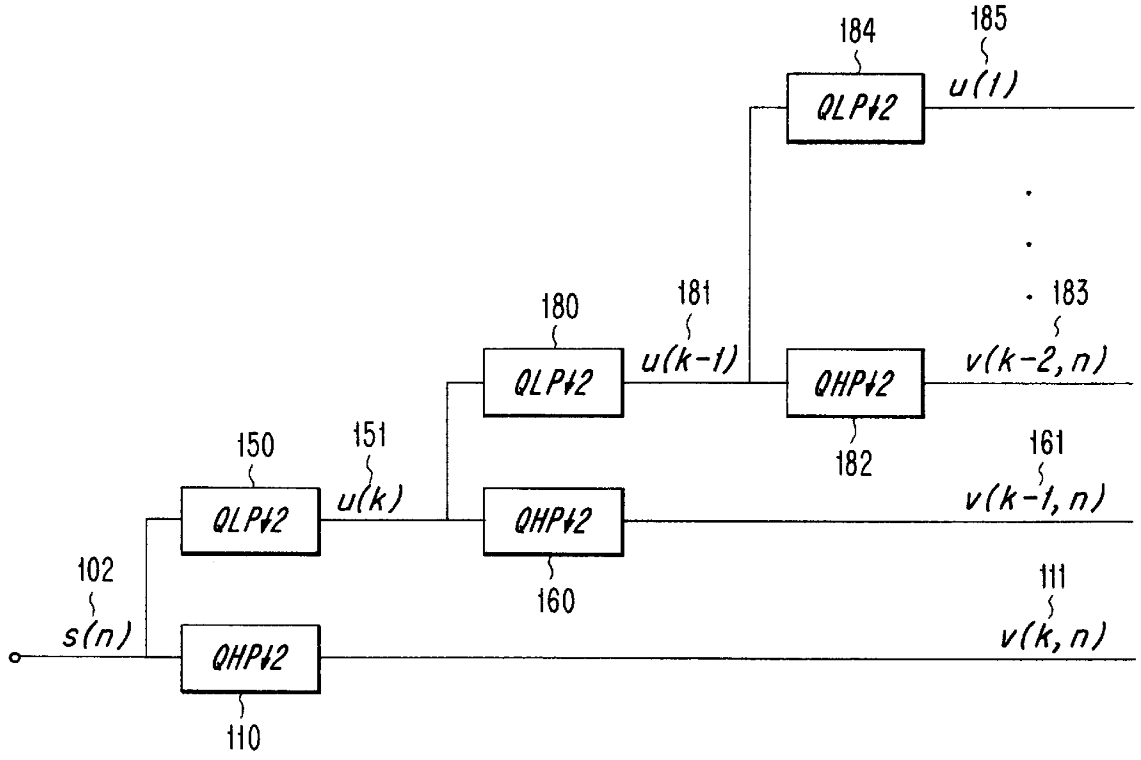
FIG. 3 illustrates schematically a fast wavelet transform pyramid.

FIG. 3 illustrates schematically a fast wavelet transform pyramid. The fast wavelet transform is obtained by cascading QHP and QLP filters in a pyramid form. Signal 102 can be any sampled signal. Samples, such as those shown in FIG. 2, can be grouped into data vectors or frames. For example, the samples in segment 50 can form a frame, half a frame, or part of a frame. Signal 102 can be a frame of sampled speech that is, for example, 20 ms in length and that is spanned by 160 samples. The length of a frame or the number of samples will depend on the system, the desired application, and the sampling rate. Frames can overlap so that samples are used in more than one frame.

Signal 102 is filtered by filters 110 and 150. Filters 110 and 150 can be FIR filters. In the example shown, filter 110 is a quadrature high pass filter that has as its coefficients orthonormal wavelet coefficients. Filter 150 is a quadrature low pass filter that as its coefficients orthonormal wavelet coefficients. Filters 110 and 150 can have the same coefficients. However, because filter 110 is a high pass filter the coefficients should have positive and negative values. When splitting a frequency bandwidth the amount of information at the output of the filter is usually decimated by a factor of two. The decimation by two has the effect of translating the analysis window into the correct frequency region while removing redundant information from the filtered signal. It will be evident to those skilled in the art that the output of each filter can be decimated by a factor less than or greater than two.

Figure 4A:
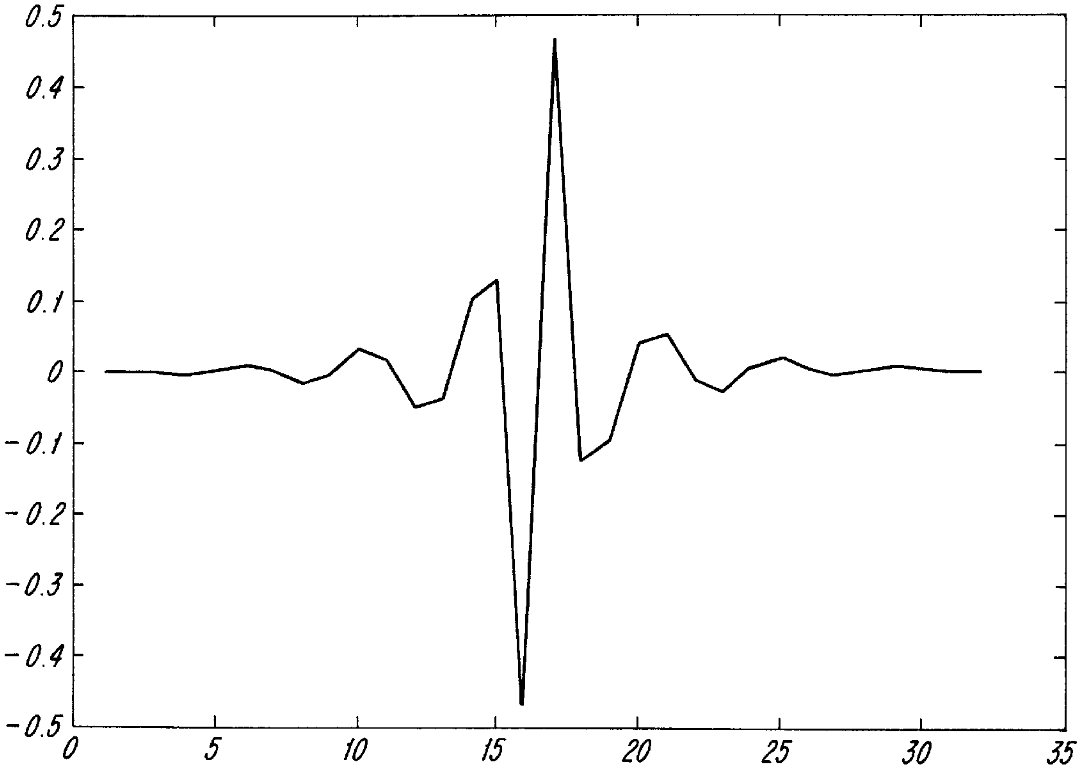
FIG. 4*a* illustrates an exemplary set of filter coefficients for a quadrature mirror high pass filter.
Figure 4B:
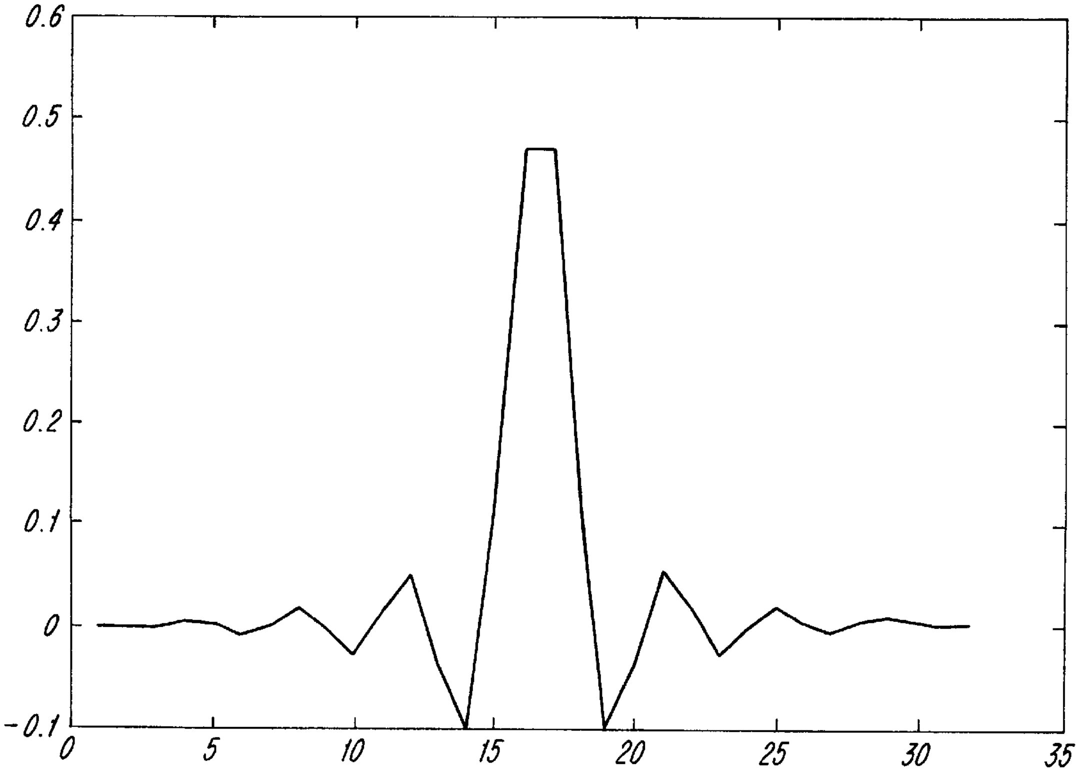
FIG. 4*b* illustrates an exemplary set of filter coefficients for a quadrature low pass filter.

FIG. 4*a* illustrates an exemplary set of filter coefficients for a quadrature mirror high pass filter. FIG. 4*b* illustrates an exemplary set of filter coefficients for a quadrature mirror low pass filter. Each high pass filter can use the same set of filter coefficients and each low pass filter can use the same set of filter coefficients, where the high pass filter coefficients and the low pass filter coefficients are given by the following formula.

$$|H_{QLP}(e^{jw})|=|H_{QHP}(e^{j(\pi-w)})| \tag{8}$$

Like the fast Fourier transform, the fast wavelet transform (FWT) algorithm does a linear operation on a data vector whose length is an integer power of two, and transforms the vector into a numerically different vector of the same length. The decimation translates the analysis window to the correct frequency region.

Referring back to FIG. 3, filter 110 transforms the input signal 102 into detail components 111. Detail components 111 can be used to determine whether there is any speech activity in input signal 102. A power estimator can estimate the signal power in signal 111 and compare the signal power estimate to a threshold value to determine whether there is any speech activity in input signal 102.

Filter 150 transforms the input signal 102 into approximation coefficients 151. Approximation coefficients 151 are filtered by filters 160 and 180. Filters 160 and 180 are FIR filters. More specifically, filter 160 is a quadrature high pass filter that has as its coefficients orthonormal wavelet coefficients. Filter 180 is a quadrature low pass filter that as its coefficients orthonormal wavelet coefficients.

Filter 160 transforms approximation coefficients 151 into detail components 161. Detail components 161 can be used to determine whether there is any speech activity in input signal 102. A power estimator can estimate the signal power in signal 160 and compare the signal power estimate to a threshold value to determine whether there is any speech activity in input signal 102.

Filter 180 transforms approximation coefficients 151 into approximation coefficients 181. Approximation coefficients 181 are filtered by filter 182 and filter 184, or alternatively, by filter 182 and additional filters until an N-point FWT is realized. The decimation by two implements the change in resolution that is due to parameter k in equation (5). An inverse FWT does the operation of the forward FWT in the opposite direction combining the transform coefficients to reconstruct the original signal. However, the inverse FWT is not necessary to determine whether there is any speech activity in input signal 102.

Figure 5:
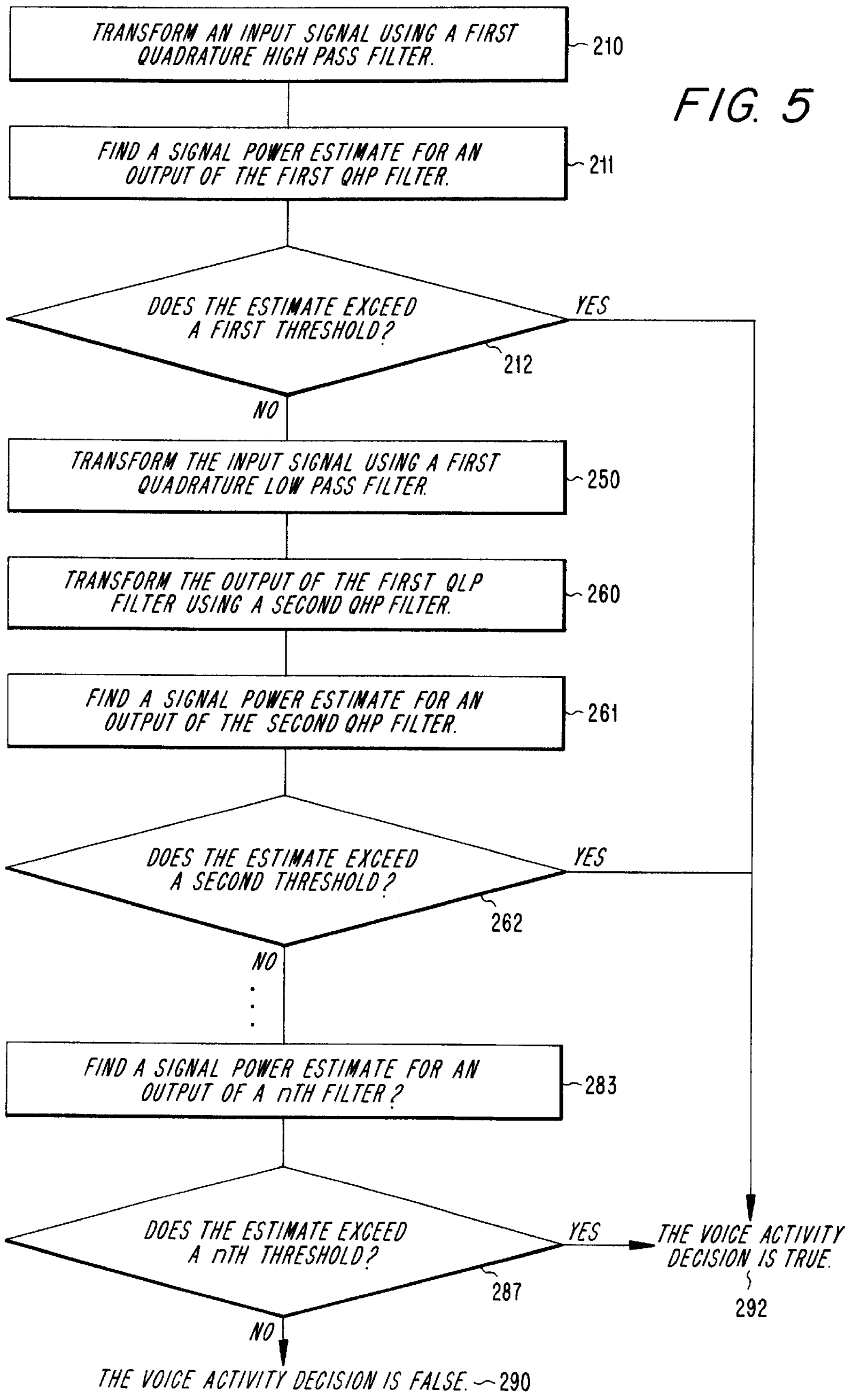
FIG. 5 illustrates a flowchart for generating a voice activity decision according to exemplary embodiments of the present invention.

FIG. 5 illustrates a flowchart for generating a voice activity decision according to exemplary embodiments of the present invention. The method shown in FIG. 5 corresponds to a voice activity detector that is designed to minimize complexity and/or power consumption.

In step 210, an input signal is transformed using a first quadrature high pass filter. In step 211, a signal power estimator finds a signal power estimate for the output of the first QHP filter. In step 212, the signal power estimate is compared to a first threshold value that is specific for the frequency band of the first QHF filter. If the signal power estimate exceeds the threshold value, a voice activity decision generator generates a decision that there is voice activity in the input signal. If the signal power estimate exceeds the first threshold value, it is not necessary to perform additional steps 250–287.

In step 250, the input signal is transformed using a first quadrature low pass filter. In step 260, the output of the first QLP filter is transformed using a second QHP filter. In step 261, a signal power estimator finds a signal power estimate for the output of the second QHP filter. In step 262, the signal power estimate is compared to a second threshold value. If the signal power estimate exceeds the threshold value then a voice activity decision generator generates a decision that there is voice activity in the input signal. If the signal power estimate exceeds the second threshold value, it is not necessary to perform additional steps 283 and 287.

As shown in FIG. 5 by the omitted steps following decision block 262, the output of the first QLP filter can be transformed using additional filters and a signal power estimator can find a signal power estimate for at least one of these additional filters. The signal power estimate can be compared to a threshold value, and if the signal power estimate exceeds the threshold value then a voice activity decision generator can generate a decision that there is voice activity in the input signal. If the signal power estimate does not exceed the threshold value, the voice activity decision generator generates a decision that there is no voice activity in the input signal. This process will conclude after N iterations, as indicated by blocks 283 and 287, where N can be selected based on design consideration such as the background noise level and reliability versus complexity tradeoffs.

While the method illustrated in FIG. 5 is helpful in reducing the complexity or power consumption associated with voice activity detection, the decision generated by the voice activity decision generator can be made more reliable by basing the voice activity decision on multiple signal power estimates instead of a single power estimate.

A voice activity detector can use a fast wavelet transform pyramid as illustrated in FIG. 3 and can generate detail components corresponding to multiple levels, e.g. 111, 161, and 183, before generating a voice activity decision. The reliability of the voice activity decision is usually increased by basing the voice activity decision on more than one signal power estimate. The reliability of the voice activity decision is increased even more by using a wavelet decomposition tree as described below.

Figure 6:
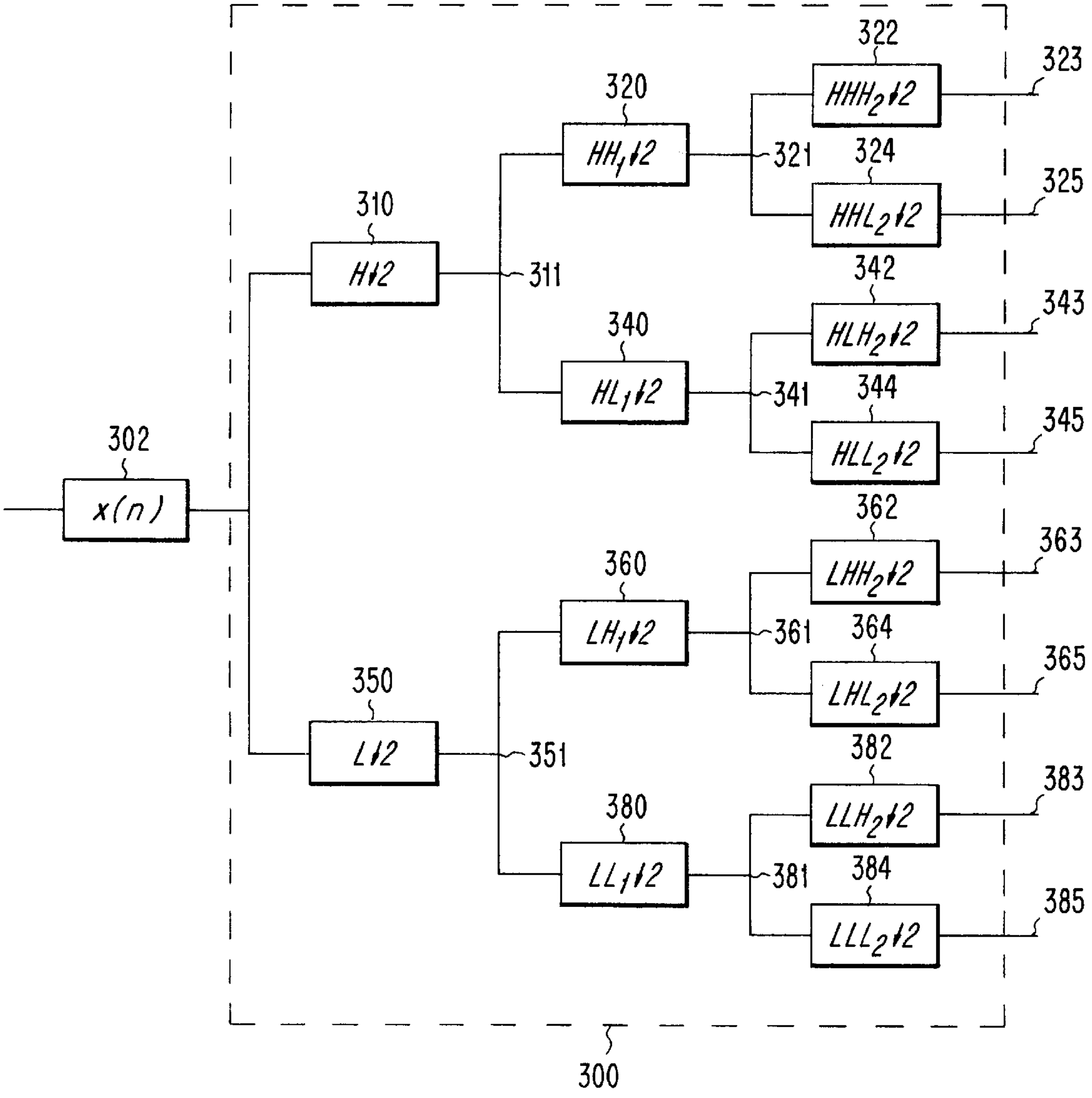
FIG. 6 illustrates a wavelet decomposition tree.

FIG. 6 illustrates a wavelet decomposition tree. A wavelet decomposition tree is especially useful for generating a voice activity decision for a noisy signal, i.e. a signal in which the voice activity is masked by high levels of background noise.

Signal 302 can be any sampled signal. For example, signal 302 can be a frame of sampled speech that is 20 ms in length and that is spanned by 160 samples. The length of a frame or the number of samples will depend on the system, the desired application, and/or the sampling rate. Frames can overlap so that samples are used in more than one frame.

The signal 302 is decomposed using a discrete wavelet transform tree 300. The discrete wavelet transform tree 300 can have a first level comprising filters 310 and 350.Filter 310 has an output node 311 and filter 350 has an output node 351. The discrete wavelet transform tree 300 can have a second level comprising filters 320, 340, 360, and 380. Filter 320 has an output node 321, filter 340 has an output node 341, filter 360 has an output node 361, and filter 380 has an output node 381.

The discrete wavelet transform tree 300 can have a third level comprising filters 322, 324, 342, 344, 362, 364, 382, and 384. Filters 322, 324, 342, 344, 362, 364, 382, 384 have output nodes 323, 325, 343, 345, 363, 365, 383, and 385. While the discrete wavelet transform tree 300 can have additional levels, three levels is usually sufficient for detecting voice activity.

The output signals at the output nodes 311, 351, 321, 341, 361, 381, 323, 325, 343, 345, 363, 365, 383, and 385 can be used to design a criteria for a voice activity decision. The detection of the voice activity regions is then based on the magnitude of the signals at the different decomposition levels.

For example, the output of filter 340 might indicate that there is no voice activity in signal 302, while the output of filter 382 indicates there is voice activity in signal 302. A combination of two decomposition levels can be used to design a robust criteria for the voice activity decision. When the voice activity decision is based on a combination of levels and/or nodes, the voice activity decision is usually more reliable.

Signal 300 is filtered by filters 310 and 350. In FIG. 5, H denotes high pass and L denotes low pass. Filters 310 and 350 can be FIR filters. In the example show, filter 310 is a quadrature high pass filter that has as its coefficients orthonormal wavelet coefficients. Filter 350 is a quadrature low pass filter that as its coefficients orthonormal wavelet coefficients. Filters 310 and 350 can have the same coefficients. However, because filter 310 is a high pass filter the coefficients will have different signs. When splitting a frequency bandwidth, the amount of information at the output of the filter is usually decimated by a factor of two. The decimation by two has the effect of translating the analysis window into the correct frequency region while removing redundant information from the filtered signal. It will be evident to those skilled in the art that the output of each filter can be decimated by a factor less than or greater than two.

As discussed above, speech is highly intelligible even when bandlimited to frequencies below about 3 kHz. For example, the signal 302 can be bandlimited to the frequency range 300 to 3400 Hz without significant loss to the speech quality of the signal. If, for example, the signal 302 has frequencies less than or equal to 3400 Hz, the Nyquist frequency for signal 302 is 3400 Hz and filters 310 and 350 can divide signal 302 into regions equal to half the Nyquist frequency. That is, filter 310 provides an output signal at node 311 representing frequencies 1700–3400 Hz and filter 350 provides an output signal at node 351 representing frequencies 0–1700 Hz.

The output signal at node 311 is filtered by QHP filter 320 and QLP filter 340 so that the output signal at node 321 represents frequencies 2550–3400 Hz and the output signal at node 341 represents frequencies 1700–2550 Hz. Similarly, the output signal at node 351 is filtered by QHP filter 360 and QLP filter 380 so that the output signal at node 61 represents frequencies 850–1700 Hz and the output signal at node 381 represents frequencies 0–850 Hz.

If the decomposition tree has a third level, the output signal at node 321 can be filtered by QHP filter 322 and QLP filter 324 so that the output signal at node 323 represents frequencies 2975–3400 Hz and the output signal at node 323 represents frequencies 2550–2975 Hz. The output signal at node 341 can be filtered by QHP filter 342 and QLP filter 344 so that the output signal at node 343 represents frequencies 2125–2550 Hz and the output signal at node 345 represents frequencies 1700–2125 Hz. Similarly, the output signal at node 361 can be filtered by QHP filter 362 and QLP filter 364 so that the output signal at node 363 represents frequencies 1275–1700 Hz and the output signal at node 364 represents frequencies 850–1275 Hz. The output signal at node 381 can be filtered by QHP filter 382 and QLP filter 384 so that the output signal at node 383 represents frequencies 425–850 Hz and the output signal at node 385 represents frequencies 0–425 Hz.

It is important to note that the use of quadrature filters to determine the voice activity in signal 302 requires fewer computations than other voice detection methods. Three decomposition levels is usually sufficient to reliably detect voice activity and it is not necessary to compute the inverse discrete wavelet transform. In addition, because the filter pairs are complimentary filters and because the filter pairs are used repeatedly, the system implementation is code efficient.

Figure 7:
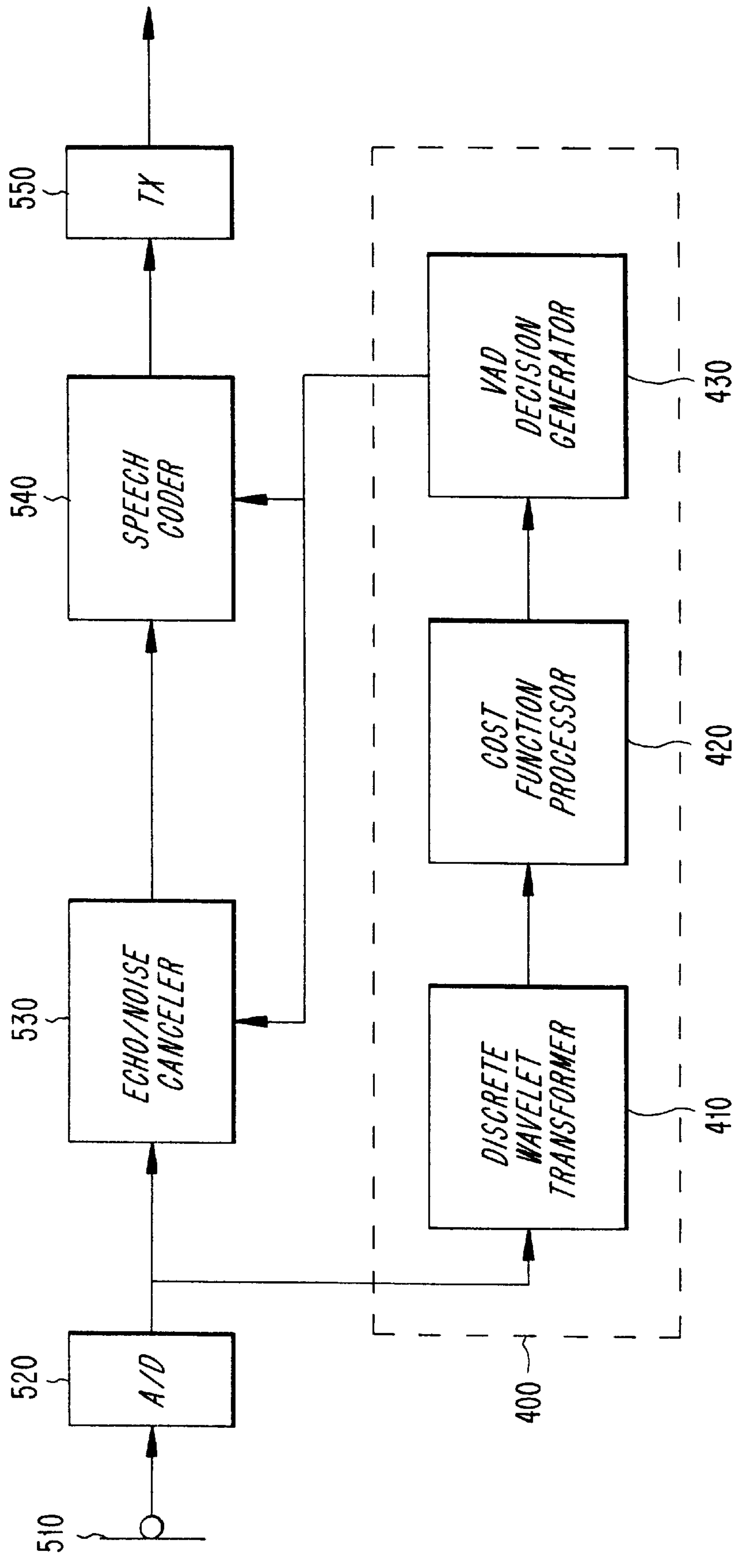
FIG. 7 illustrates an exemplary embodiment of the present invention.

If, for example, the power estimate for the ith wavelet filter bank is given by the equation $$P_i = \frac{1}{N}\sum_{K=1}^{N} V_K^2 \tag{9}$$

for each frame of length N/M, where M is the decimation factor. The average of P over M a number of frames of speech can be used to form a cost function. FIG. 7 illustrates an exemplary embodiment of the present invention. A voice activity detector 400 can be used to control a discontinuous transmission handler 550 or to assist an echo/noise canceler 530. A microphone 510 provides an input signal to an analog-to-digital converter 520. The input signal can be filtered using a bandlimited filter (not shown). The analog-to-digital converter 520 samples the input signal and maps the samples to predetermined levels. The quantized signal can be filtered by a reconstruction filter (not shown). The sampled signal can be divided into frames of samples.

An echo/noise canceler 530 is used to cancel echos or to suppress noise in the input signal. Each frame of samples is coded using a speech coder 540. The discontinuous transmission handler 550 receives coded frames from the speech coder 540. If the voice activity decision is true, the frame of samples is transmitted. If the voice activity decision is false, the frame of samples is not transmitted. The voice activity decision can also be used to assist the echo/noise canceler 530. The voice activity decision enables the echo/noise cancels to form good estimates of the noise parameters and the speech parameters. Using the voice activity decision, the echo/noise canceled can detect double talk and high echos.

A voice activity detector 400 has a discrete wavelet transformer 410. The discrete wavelet transformer 410 transforms a frame of samples to provide output signals corresponding to different levels of decomposition. The voice activity detector 400 has a cost function processor 420 that evaluates at least one of the output signals. The cost function processor 420 can compare signal power estimates for the output signals to different threshold levels. The cost function processor 420 can be trained to determine the optimum threshold levels. The cost function processor 420 assists a voice activity decision generator 430 in generating a voice activity decision.

Generally speaking, if a n output signal has a signal power estimate that exceeds a threshold level, the voice activity decision is true. If none of the output signals have a signal power estimate that exceeds a threshold level, the voice activity decision is false. By basing the decision on more than one output signal, the voice activity decision can be made reliable. For example, if a background noise level increases, the signal power estimate for a particular output signal can increase. Therefore, a decision based on two or ore of the output signals is more reliable than a decision base on only one signal.

While the foregoing description makes reference to particular illustrative embodiments, these examples should not be construed as limitations. It will be evident to those skilled in the art that the disclosed methods and apparatuses for distinguishing between two non-stationary signals can be adapted and modified for other applications without departing from the spirit of the invention. For example, there are similar pyramid or tree structures that are less complex (i.e., have fewer transformations) or more reliable (i.e., have more transformations) than the exemplary embodiments described above. Thus, the present invention is not limited to the disclosed embodiments, but is to be accorded the widest scope consistent with the claims below.

What is claimed is:

1. An audio signal activity detector comprising:

a plurality of filters having orthonormal wavelet coefficients for transforming an input audio signal; and a signal activity decision generator that generates a signal activity decision based on at least one output of said plurality of filters.

2. A detector in accordance with claim 1, wherein the signal activity decision generator is a voice activity decision generator that generates a voice activity decision.

3. A detector in accordance with claim 1, wherein said plurality of filters further comprises:

a first filter having orthonormal wavelet coefficients, the first filter transforming said input signal to provide a first output signal;

a second filter having orthonormal wavelet coefficients, the second filter transforming the input signal to provide a second output signal;

a third filter having orthonormal wavelet coefficients, the third filter transforming the first output signal to provide a third output signal;

a fourth filter having orthonormal wavelet coefficients, the fourth filter transforming the first output signal to provide a fourth output signal;

a fifth filter having orthonormal wavelet coefficients, the fifth filter transforming the second output signal to provide a fifth output signal; and a sixth filter having orthonormal wavelet coefficients, the sixth filter transforming the second output signal to provide a sixth output signal.

4. A detector in accordance with claim 3, wherein the first filter is a quadrature high pass filter and the second filter is a quadrature low pass filter.

5. A signal activity detector in accordance with claim 3, wherein the first filter is a quadrature high pass filter and the second filter is a quadrature low pass filter, the third filter is a quadrature high pass filter and the fourth filter is a quadrature low pass filter, and the fifth filter is a quadrature high pass filter and the sixth filter is a quadrature low pass filter.

6. A signal activity detector in accordance with claim 5, wherein the signal activity decision is determined by a cost function that is dependent on at least two outputs selected from the group including outputs from the third filter, the fourth filter, the fifth filter, and the sixth filter.

7. A signal activity detector in accordance with claim 5, wherein the cost function is dependent on at least one output selected from the group including outputs from the first filter and the second filter.

8. A detector in accordance with claim 1, wherein the signal activity decision is based on more than one output signal.

9. A detector in accordance with claim 1, further comprising a first signal power estimator that generates a first signal power estimate for one of the output signals of said plurality of filters.

10. A detector in accordance with claim 9, further comprising a first comparator for comparing the signal power estimate to a first threshold level.

11. A detector in accordance with claim 10, further comprising a second signal power estimator that generates a second signal power estimate for another one of the output signals of said plurality of filters.

12. A detector in accordance with claim 11, further comprising a second comparator for comparing the second signal power estimate to a second threshold level, the second threshold level being different from the first threshold level.

13. A method for detecting audio signal activity comprising the steps of:

filtering an input signal using a first quadrature high pass filter and a first quadrature low pass filter;

filtering an output of the high pass filter using a second quadrature high pass filter and a second quadrature low pass filter storing an output of the second quadrature high pass filter and an output of the second quadrature low pass filter;

filtering an output of the first low pass filter using a third quadrature high pass filter and a third quadrature low pass filter;

storing an output of the third quadrature high pass filter and an output of the third quadrature low pass filter; and generating a signal activity decision based on an output of at least two of the filters.

14. A method in accordance with claim 13, wherein the step of generating a signal activity decision comprises the step of generating a first signal power estimate for one of the outputs of the filters.

15. A method in accordance with claim 14, wherein the step of generating a signal activity decision further comprises the step of comparing the first signal power estimate to a first threshold level.

16. A method in accordance with claim 15, wherein the step of generating a signal activity decision further comprises the step of generating a second signal power estimate for another one of the output signals.

17. A method in accordance with claim 13, wherein the step of generating a signal activity decision comprises the step of evaluating a cost function that is dependent on at least two outputs selected from the group consisting of the output of the second quadrature high pass filter, the second quadrature low pass filter, the third quadrature high pass filter, and the third quadrature low pass filter.

18. A method in accordance with claim 17, wherein the cost function is dependent on at least one output selected from the group consisting of the first quadrature high pass filter and the first quadrature low pass filter.

19. An audio signal activity detector comprising:

a first filter having orthonormal wavelet coefficients, the first filter transforming an input signal to provide a first output signal;

a second filter having orthonormal wavelet coefficients, the second filter transforming the input signal to provide a second output signal;

a third filter having orthonormal wavelet coefficients, the third filter transforming the first output signal to provide a third output signal;

a fourth filter having orthonormal wavelet coefficients, the fourth filter transforming the first output signal to provide a fourth output signal;

a fifth filter having orthonormal wavelet coefficients, the fifth filter transforming the second output signal to provide a fifth output signal;

a sixth filter having orthonormal wavelet coefficients, the sixth filter transforming the second output signal to provide a sixth output signal; and a signal activity decision generator that generates a signal activity decision based on at least one output of the first filter, the second filter, the third filter, the fourth filter, the fifth filter and the sixth filter.

20. The detector in accordance with claim 19, wherein the first filter, the third filter and the fifth filter are quadrature high pass filters and the second filter, the fourth filter and the sixth filter are quadrature low pass filters.

21. The detector in accordance with claim 19, wherein the signal activity decision is determined by a cost function that is dependent on at least one of the outputs of the first filter and the second filter.

22. The detector in accordance with claim 19, wherein the signal activity decision is determined by a cost function that is dependent on at least two of the outputs of the third filter, the fourth filter, the fifth filter and the sixth filter.

23. The detector in accordance with claim 19, further comprising a first signal power estimator that generates a first signal power estimate for one of the outputs of the first filter, the second filter, the third filter, the fourth filter, the fifth filter and the sixth filter.

24. The detector in accordance with claim 23, further comprising a first comparator for comparing the first signal power estimate to a first threshold level.

25. The detector in accordance with claim 24, further comprising a second signal power estimator that generates a second signal power estimate for another one of the outputs of the first filter, the second filter, the third filter, the fourth filter, the fifth filter and the sixth filter.

26. The detector in accordance with claim 25, further comprising a second comparator for comparing the second signal power estimate to a second threshold level, the second threshold level being different from the first threshold level.

* * * * *